INVENTOR
LAWRENCE K. HYDE

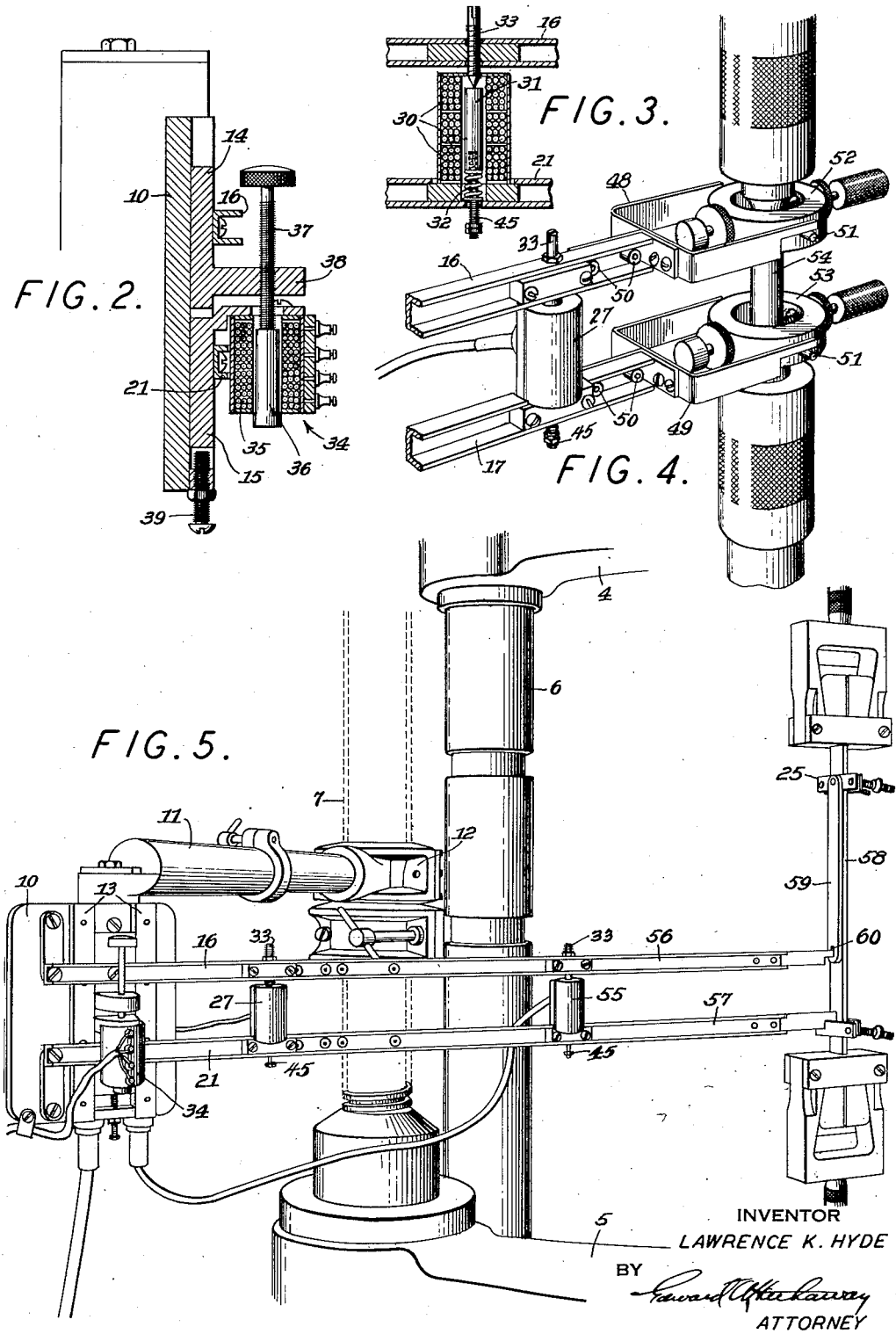

Patented Dec. 11, 1951

2,578,066

UNITED STATES PATENT OFFICE 2,578,066

MULTIRANGE EXTENSOMETER

Lawrence K. Hyde, Washington, D. C., assignor to Baldwin-Lima-Hamilton Corporation, a corporation of Pennsylvania Application June 23, 1950, Serial No. 169,924

5 Claims. (Cl. 73—88.5)

This invention relates generally to motion sensitive devices and more particularly to extensometers for determining strain of specimens under test in a materials testing machine and it is one object of my invention to provide an improved dual type motion sensitive device one application of which is as a dual extensometer whereby an essentially continuous record can be made at high magnification through the elastic portion of the specimen and at low strain magnification through the plastic portion of the test specimen and up to failure thereof.

A further object is to provide an improved extensometer for the elastic and plastic ranges that is relatively simple in construction, operation and maintenance, is relatively economical for a device of this type and can be readily applied to specimens with minimum time, effort or complications.

Various extensometers have been heretofore proposed and used for determining low and high magnifications but these had to be used in a manner that produced a discontinuous record between the elastic and plastic ranges, and in some circumstances one specimen had to be employed for the elastic range and another specimen for the plastic range, while still other of these prior devices were similarly deficient either functionally, structurally or economically.

Other objects and advantages will be more apparent to those skilled in the art from the following description of the accompanying drawings in which:

Fig. 2 is an enlarged transverse section taken substantially in the plane of lines 2—2 of Fig. 1;

Fig. 3 is a section taken substantially in the plane of lines 3—3 of Fig. 1;

Fig. 4 is a fragmentary perspective showing the extensometer of Fig. 1 with adaptors for applying the extensometer to a cylindrical type of specimen; and Fig. 5 is a perspective of my dual type extensometer with adaptors to apply either a different high range magnification or a third range of magnification in case such should be desired.

Figure 1:
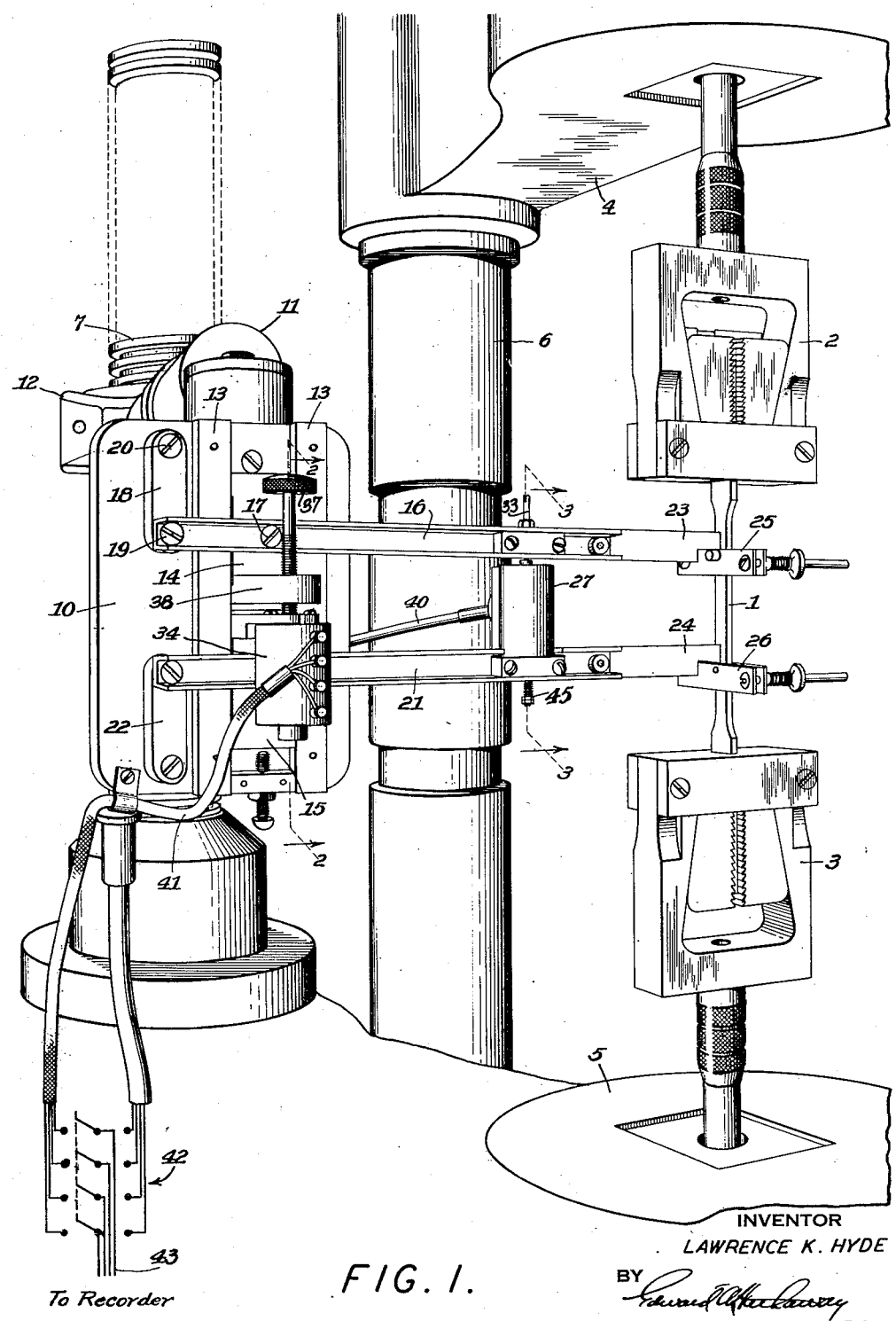
Fig. 1 is a perspective of a portion of a materials testing machine with my improved dual type extensometer shown as applied to a tension specimen.

In the particular embodiment of the invention disclosed in Fig. 1, I have shown my improved extensometer applied to a strip type specimen 1 held in suitable upper and lower grips 2 and 3 which in turn are mounted in upper and lower testing machine crossheads 4 and 5. These crossheads are respectively mounted on a pair of loading columns 6, only one of which is shown, and on a pair of load sensitive columns 7, only one of which is shown. Inasmuch as the testing machine per se is well-known, further detailed description thereof is not necessary.

The extensometer includes a vertical base plate 10 supported upon a horizontal bar 11 which, as shown in Fig. 5, is longitudinally extensible as well as being rotatably adjustable, the inner end of the supporting arm 11 having a bracket 12 adapted to be releasably clamped on the column 7 for adjustment in any position along its length. As shown in Fig. 1 a pair of guideways 13 are formed on base plate 10 to receive vertically slidable upper and lower blocks 14 and 15. An upper extensometer arm 16 is pivotally supported at 17 on slidable block 14 while a link 18 is pivotally connected at 19 to the arm and at 20 to base plate 10. Similarly, a lower extensometer arm 21 is pivotally connected to block 15 and to base plate 10 through a link 22. The outer ends 23 and 24 of these extensometer arms freely rest downwardly upon suitable gage heads 25 and 26 removably clamped to specimen 1 and spaced apart thereon a desired gage length distance.

A high magnification strain sensitive device 27 comprises preferably an electro magnetic motion responsive device of the type shown in Patent No. 2,427,866 or any equivalent electrical strain sensitive impedance device. As shown in Fig. 3, this device includes a plurality of electrical coils 30 rigidly secured to the lower extensometer arm 21 while a core 31 of magnetic material is biased upwardly by a spring 32 against a pointed screw 33 adjustably mounted in upper arm 16. A screw and nuts 45, secured in core 31, serve as a limit stop for upward movement of the core by the nuts engaging the underside of arm 21. A low strain sensitive device 34 similar to 27 is mounted adjacent the pivotal end of the extensometer arms. This sensitive device, as shown in Fig. 2, has its coils 35 secured to slide block 15 while its core 36 is formed on a screw 37 adjustably mounted on a lug 38 of slide block 14. A lower screw 39 is adapted to pre-set the lowermost position of sliding block 15 and, accordingly, that of coils 35.

The two strain sensitive electrical devices 27 and 34 are connected by suitable cables 40 and 41 to a sequence switch 42 having a common set of wires 43 which lead to a suitable recorder such, by way of example but not of limitation, as shown in Patent 2,451,757. Further description in this present application of this recorder and its mode of operation to the sensitive elements 27 or 34 will not be necessary in view of this patent.

*In Operation.*—After the specimen gage supports 25 and 26 are clamped upon the specimen, the arm 11 and base plate 10 are positioned on screw 7 so that extensometer arms 16 and 21 are substantially horizontal and rest freely upon the gage clamps. The position of the core of the low magnification sensitive device 34 is then pre-set by adjustment of screw 37, Fig. 2, so that the relationship of the position of this core to that of the high magnification sensitive element 27 is such that when sequence switch 42 shifts the extensometer from high magnification element 27 to low magnification element 34 there will be a substantially continuous recording. It is believed to be clear that high magnification, of the relatively small strain of the specimen during its elastic range, is effective for the reason that the moment arm from the pivot links 18 and 22 to element 27 is of considerable length, whereas low magnification during the relatively large strain of the specimen during its plastic range results from the proportionately smaller moment arm from links 18 and 22 to element 34. It is also clear from the particular nature of the sensitive elements 27 and 34 that during the large elongation of the specimen in its plastics range, no damage can result to either of the sensitive elements as the core 36, Fig. 2, can freely move while, as shown in Fig. 3, the pointed pin 33 may readily separate from its core 31. Also the foregoing arrangement permits the extensometer to remain on the specimen clear through failure thereof.

Hence it is seen that I have provided an extremely simple, yet highly accurate, sensitive and responsive extensometer having multiple magnification ranges as well as being easily and readily attached to a specimen.

In the modification shown in Fig. 4 the ends of the extensometer arms 16 and 17 have had its strip type specimen extensions 23 and 24, Fig. 1, removed and a pair of U-shaped extensions 48 and 49 substituted, these various extensions being readily attached or removed by screws such as 50. The ends of the U-shaped extensions rest upon pins 51 of cylindrical type gage heads 52 and 53 which are particularly suited for a cylindrical specimen 54 in distinction to the strip specimen 1.

The modification of Fig. 5 is adapted for very long gage lengths in which case the high magnification sensitive element 55 is mounted between extensions 56 and 57 of the extensometer arms 16 and 21. In order to maintain the extensometer arms substantially parallel while still permitting an exceptionally long gage length to be employed on specimen 58, a link 59 may be pivotally connected to the upper gage point head 25 and provided with a slot 60 at its lower end to receive the finger of arm 56. The operation of Fig. 5 is the same as described for Fig. 1 except that the sequence switch would be connected to elements 55 and 27 or to 55 and 34.

From the foregoing disclosure of the several modifications, it is seen that I have provided a very effective, highly compact, and accurate multiple range magnification extensometer that is relatively simple and economical, as well as being easily and readily applied to specimens.

It will, of course, be understood by those skilled in the art that various changes may be made in the construction and arrangement of parts without departing from the spirit of the invention as set forth in the appended claims.

I claim:

1. An extensometer for determining strain in the elastic and plastic ranges of a specimen, comprising, in combination, a pair of extensometer arms pivotally supported at one end thereof and their other ends being supported by the specimen whereby the arms at varying points along their length move relative to each other in proportion to the distance of said points from the pivotal ends of said arms, a motion responsive device connected to said arms at one point thereof so as to effect a given magnification suitable for the elastic range of the specimen, a second motion responsive device also connected to said arms at a point between the pivoted ends of said arms and said other motion responsive device so that a smaller degree of magnification can be effected for the plastic range of the specimen, and means for obtaining a substantially continuous response through the elastic and plastic ranges of the specimen by rendering said motion responsive devices sequentially operable.

2. The combination set forth in claim 1 further characterized in that one of said motion responsive devices includes relatively movable portions, one of which is supported by one of said arms and the other of which has separable engagement with the other of said arms whereby upon an excessive amount of movement between the arms, the said engagement is discontinued without damage to the motion responsive device.

3. The combination set forth in claim 1 further characterized in that one of said motion responsive devices has relatively movable portions freely separable from each other and one of which is connected to the one of said arms and the other of which is connected to the other arm.

4. The combination set forth in claim 1 further characterized in that the motion responsive devices have electro magnetic coils supported by one of the arms and cores freely movable within the respective coils connected to the other of the arms.

5. The combination set forth in claim 1 further characterized in that the motion responsive devices have electro magnetic coils supported by one of the arms and cores connected to the other of the arms and freely movable within the respective coils, and means for relatively positioning the cores and coils of the respective responsive devices so that the effectiveness of one motion responsive device will be substantially continuous with that of the other responsive device when said devices are rendered sequentially operable.

LAWRENCE K. HYDE.

REFERENCES CITED

The following references are of record in the file of this patent:

UNITED STATES PATENTS

| Number | Name | Date |
| --- | --- | --- |
| 1,431,638 | Dowling | Oct. 10, 1922 |
| 1,912,213 | Nicolson | May 30, 1933 |
| 2,176,016 | Sivertsen | Oct. 10, 1939 |
| 2,180,175 | Sivertsen | Nov. 14, 1939 |
| 2,305,816 | Sonnberger | Dec. 22, 1942 |
| 2,387,496 | Cornelius | Oct. 23, 1945 |
| 2,393,669 | Wheaton | Jan. 29, 1946 |